United States Patent
Yan et al.

(10) Patent No.: US 9,258,166 B2
(45) Date of Patent: Feb. 9, 2016

(54) TIMING SYNCHRONIZATION APPARATUS AND METHOD FOR MULTI-CARRIER MODULATION SIGNALS

(71) Applicant: FUJITSU LIMITED, Kawasaki-shi, Kanagawa (JP)

(72) Inventors: Weizhen Yan, Beijing (CN); Lei Li, Beijing (CN); Zhenning Tao, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/524,026

(22) Filed: Oct. 27, 2014

(65) Prior Publication Data

US 2015/0117576 A1    Apr. 30, 2015

(30) Foreign Application Priority Data

Oct. 31, 2013 (CN) .......................... 2013 1 0529306

(51) Int. Cl.
    *H04L 27/26* (2006.01)
    *H04L 7/00* (2006.01)
    *H04L 25/03* (2006.01)

(52) U.S. Cl.
    CPC .......... *H04L 27/2662* (2013.01); *H04L 7/0041* (2013.01); *H04L 25/03821* (2013.01)

(58) Field of Classification Search
    None
    See application file for complete search history.

(56) References Cited

U.S. PATENT DOCUMENTS

| | | | |
|---|---|---|---|
| 2003/0063678 A1* | 4/2003 | Crawford | 375/260 |
| 2007/0036231 A1* | 2/2007 | Ido | 375/260 |
| 2007/0072636 A1* | 3/2007 | Worfolk et al. | 455/502 |
| 2007/0082633 A1* | 4/2007 | Carbone et al. | 455/166.2 |
| 2011/0194438 A1* | 8/2011 | Rahbar | 370/252 |
| 2011/0305290 A1* | 12/2011 | Kim et al. | 375/267 |
| 2012/0230456 A1* | 9/2012 | Ray | 375/362 |

* cited by examiner

*Primary Examiner* — Leon-Viet Nguyen
(74) *Attorney, Agent, or Firm* — Staas & Halsey LLP

(57) ABSTRACT

Embodiments of the present invention provide a timing synchronization apparatus and method for multi-carrier modulation signals. Wherein the apparatus includes: a predicting unit configured to denoise delay of symbols received before a currently received symbol, and to predict delay of the currently received symbol or of a symbol received after the currently received symbol according to the denoised symbol delay and a sampling clock frequency offset; and a timing synchronization unit configured to perform timing synchronization according to a predicted value of the delay of the currently received symbol or of the symbol received after the currently received symbol. With the apparatus and method, a signal to noise ratio of multi-carrier modulation signals may be effectively improved, and an effect of a timing error on a communication system may be lowered, thereby improving performance of the communication system.

8 Claims, 4 Drawing Sheets

TIMING SYNCHRONIZATION APPARATUS AND METHOD FOR MULTI-CARRIER MODULATION SIGNALS

CROSS REFERENCE TO RELATED APPLICATIONS

This application claims the benefit of Chinese Application No. 201310529306.1, filed Oct. 31, 2013, the disclosure of which is incorporated herein by reference.

TECHNICAL FIELD

The present invention relates to the field of communications, and in particular to a timing synchronization apparatus and method for multi-carrier modulation signals.

BACKGROUND

Currently, multi-carrier modulation is widely used in the field of communications, which may be achieved by multiple technical means, such as discrete multi-tone (DMT) and orthogonal frequency division multiplexing (OFDM), etc. The multi-carrier modulation employs multiple subcarrier signals, and divides a data stream into several sub-data streams, so that the sub-data streams have much less transmission bit rates, and the data are used to modulate several subcarriers, respectively. Multi-carrier modulation signals are characterized in a relatively low subcarrier data transmission rate and a relatively long code element period. At present, fast Fourier transform (FFT) is an effective way of achieving multi-carrier modulation.

Multi-carrier modulation signals are relatively sensitive to a timing error, which will bring inter-symbol interference (ISI) and inter-channel interference (ICI) to the multi-carrier modulation signals, and degrade signal quality. Hence, timing synchronization needs to be performed to the multi-carrier modulation signals. Wherein, the timing synchronization of the multi-carrier modulation signals includes symbol synchronization (or frame synchronization) and sampling clock recovery. An object of the symbol synchronization is to find a correct FFT window, and an object of the sampling clock recovery is to align a clock of a receiver with a clock of a transmitter, including offset and jitter of clock frequencies.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

An object of embodiments of the present invention is to provide a timing synchronization apparatus and method for multi-carrier modulation signals, which are capable of effectively improving a signal to noise ratio of multi-carrier modulation signals, and lowering an effect of a timing error on a communication system, thereby improving performance of the communication system.

According to a first aspect of embodiments of the present invention, there is provided a timing synchronization apparatus for multi-carrier modulation signals, including: a predicting unit configured to denoise delay of symbols received before a currently received symbol, and to predict delay of the currently received symbol or of a symbol received after the currently received symbol according to the denoised symbol delay and a sampling clock frequency offset; and a timing synchronization unit configured to perform timing synchronization according to a predicted value of the delay of the currently received symbol or of the symbol received after the currently received symbol.

According to a second aspect of embodiments of the present invention, there is provided a receiver, including the apparatus as described according to the first aspect of embodiments of the present invention.

According to a third aspect of embodiments of the present invention, there is provided a timing synchronization method for multi-carrier modulation signals, including: denoising delay of symbols received before a currently received symbol, and predicting delay of the currently received symbol or of a symbol received after the currently received symbol according to the denoised symbol delay and a sampling clock frequency offset; and performing timing synchronization according to a predicted value of the delay of the currently received symbol or of the symbol received after the currently received symbol.

An advantage of embodiments of the present invention resides in that a signal to noise ratio of a multi-carrier modulation signal may be effectively improved, and an effect of a timing error on a communication system may be lowered, thereby improving performance of the communication system.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating principles of the present invention. To facilitate illustrating and describing some parts of the invention, corresponding portions of the drawings may be exaggerated or reduced in size. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

The timing synchronization apparatus and method for multi-carrier modulation signals of the embodiments of the present invention shall be described below with reference to the accompanying drawings.

Embodiment 1

Figure 1:
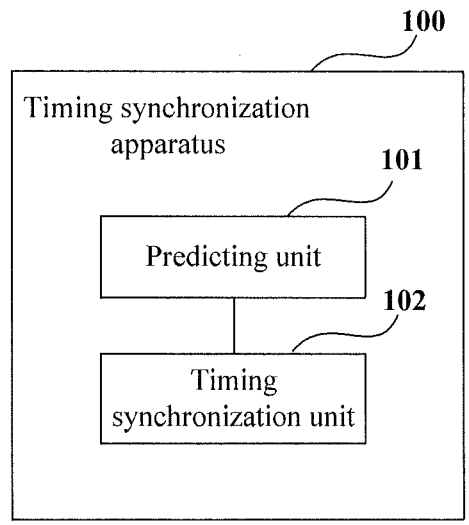
FIG. 1 is a schematic diagram of a structure of a timing synchronization apparatus for multi-carrier modulation signals of Embodiment 1 of the present invention.

FIG. 1 is a schematic diagram of a structure of a timing synchronization apparatus for multi-carrier modulation signals of Embodiment 1 of the present invention, which is arranged at a signal receiving side of a communication system. As shown in FIG. 1, apparatus 100 includes: a predicting unit 101 and a timing synchronization unit 102; wherein, predicting unit 101 is configured to denoise delay of symbols received before a currently received symbol, and to predict delay of the currently received symbol or of a symbol received after the currently received symbol according to the denoised symbol delay and a sampling clock frequency offset;

and timing synchronization unit 102 is configured to perform timing synchronization according to a predicted value of the delay of the currently received symbol or of the symbol received after the currently received symbol.

It can be seen from the above embodiment that by predicting delay of a currently received symbol or of a symbol received after the currently received symbol according to denoised delay of previously received symbols and performing timing synchronization based on the predicted symbol delay, a signal to noise ratio of multi-carrier modulation signals may be effectively improved, and an effect of a timing error on a communication system may be lowered, thereby improving performance of the communication system.

In this embodiment, any existing method may be used for obtaining the delay of the symbols received before the currently received symbol and the sampling clock frequency offset, and it is not limited in embodiments of the present invention. Following description is given by way of examples.

For example, the delay of the symbols received before the currently received symbol may be obtained by using a symbol delay detection method; wherein, the symbol delay detection method is based on one or more pilot subcarriers/subcarrier pairs;

when the detection is performed based on a pilot subcarrier, by measuring a phase shift $\phi_k$ of a k-th subcarrier, delay $\hat{\tau}_{sp}$ of a k-th symbol received before the currently received symbol may be obtained by using formula (1) below:

$$\hat{\tau}_{sp} = \frac{\phi_k}{2\pi(k-1)\Delta f}; \quad (1)$$

where, $\Delta f$ denotes a subcarrier frequency interval, and $\phi_k$ denotes the phase shift of the k-th subcarrier, k being a positive integer;

when the detection is performed based on a pilot subcarrier pair, delay $\hat{\tau}_{pp}$ of the k-th symbol received before the currently received symbol may be obtained by using formula (2) below:

$$\hat{\tau}_{pp} = \frac{\phi_{k_1} - \phi_{k_2}}{2\pi(k_1 - k_2)\Delta f}; \quad (2)$$

where, $\Delta f$ denotes a subcarrier frequency interval, $k_1$ and $k_2$ denote sequence numbers of the subcarrier pair, and $\phi_{k_1}$ and $\phi_{k_2}$ denote phase shifts of corresponding subcarriers, $k_1$ and $k_2$ being positive integers.

If the detection is performed by using multiple pilot subcarriers or subcarrier pairs, averaging of multiple pilot subcarriers/subcarrier pairs may be performed to the above estimated symbol delay.

According to the method above, the delay of several symbols received before the currently received symbol may be obtained; however, embodiments of the present invention is not limited thereto. Any existing method may be used for obtaining the sampling clock frequency offset according to the delay of the several symbols received before the currently received symbol, and it is not limited in embodiments of the present invention. Following description is given by way of examples.

For example, after the delay of the several previously received symbols is obtained, the sampling clock frequency offset may be obtained by using formula (3) below:

$$\Delta f_s = -\frac{\sum_{k=N/2+1}^{N} \hat{\tau}_k - \sum_{k=1}^{N/2} \hat{\tau}_k}{(N/2)^2(2N_{SC} + N_{CP})} f_s^2; \quad (3)$$

where, $\hat{\tau}_k$ is delay of a k-th symbol received before the currently received symbol, $N_{SC}$ is a number of subcarriers, $N_{CP}$ is a number of cyclic prefixes, and $f_s$ is the sampling clock frequency offset.

Figure 2:
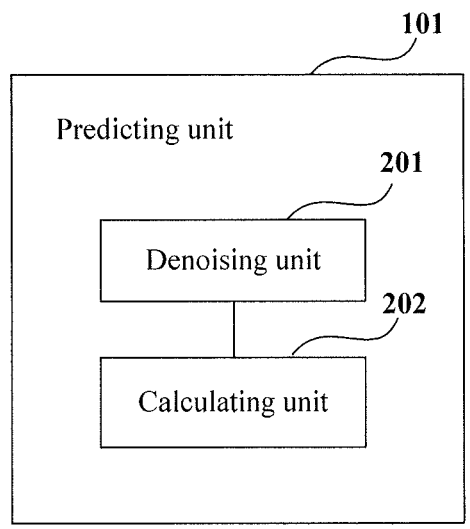
FIG. 2 is a schematic diagram of a structure of a predicting unit of Embodiment 1 of the present invention.

FIG. 2 is a schematic diagram of a structure of predicting unit 101 of this embodiment; however, embodiments of the present invention are not limited to such a structure. As shown in FIG. 2, predicting unit 101 includes: a denoising unit 201 and a calculating unit 202; wherein, denoising unit 201 is configured to denoise delay of the symbols received before the currently received symbol;

and calculating unit 202 is configured to predict the delay of the currently received symbol or of the symbol received after the currently received symbol according to the denoised symbol delay and the sampling clock frequency offset.

In this embodiment, any existing method may be used by denoising unit 201 for denoising the delay of the symbols received before the currently received symbol, and it is not limited in embodiments of the present invention. Furthermore, the number of the denoised symbols received before the currently received symbol is not limited in embodiments of the present invention.

For example, the denoising unit may include an average value calculator or an infinite impulse response filter; wherein, when denoising unit 201 includes an average value filter, the average value calculator is configured to calculate average delay of the symbols received before the currently received symbol, and take the average delay as the denoised symbol delay; and wherein, the average delay may be calculated by using formula (4) below:

$$\hat{\tau}_{middle} = \sum_{k=1}^{2M+1} c_k \hat{\tau}_k; \quad (4)$$

where, $\hat{\tau}_k$ is delay of a k-th symbol received before the currently received symbol, $c_k$ is a weighted coefficient, k being a positive integer; let K=2M+1, K being a positive integer.

Wherein, any existing method may be used for determining the weighted coefficient, and it is not limited in embodiments of the present invention. For example, a weighted coefficient of an intermediate symbol in K symbols is relatively large, and a weighted coefficient of a symbol away from the intermediate symbol is relatively small. If $$c_k = \frac{1}{2M+1},$$

the average delay is equally weighted averaging, that is, arithmetical averaging.

When denoising unit 201 includes an infinite impulse response (IIR) filter, the infinite impulse response filter is configured to perform infinite impulse response filtering to the delay of the symbols received before the currently received symbol, and take the infinite impulse response filtered delay as the denoised symbol delay. Wherein, a filtering function of the filter may be denoted by formula (5) below:

$$y(n) = \frac{1}{p}y(n-1) + x(n); \quad (5)$$

where, y(n) denotes an output signal filtered at an n-th time, y(n-1) denotes an output signal filtered at an (n-1)-th time, x(n) denotes an input signal of the filter, p denotes a filtering coefficient, p>0, n being a positive integer, and n≤N, N denoting a number of the symbols received before the currently received symbol.

In this embodiment, calculating unit 202 is configured to predict the delay of the currently received symbol or of the symbol received after the currently received symbol according to the denoised symbol delay and the sampling clock frequency offset; wherein, any existing method may be used as a predicting method, and it is not limited in the present invention. Following description is given by way of examples.

For example, calculating unit 202 may calculate the predicted value of the delay of the currently received symbol or of the symbol received after the currently received symbol according to the above average delay and a delay offset caused by the sampling clock frequency offset, or the infinite impulse response filtered delay and a delay offset caused by the sampling clock frequency offset. Wherein, the predicted value may be calculated by using formula (6) below:

$$\hat{\tau}_{P,j} = \hat{\tau}_{middle} - (M+j)(2N_{SC}+N_{CP})\Delta f_s/f_s^2 \quad (6)$$

where, j is a positive integer; when j=1, $\hat{\tau}_{P,j}$ denotes a predicted value of the delay of the currently received symbol; and when j=L and L is an integer greater than 1, $\hat{\tau}_{P,j}$ denotes a predicted value of delay of an L-th symbol after the currently received symbol; $f_s$ denotes a sampling clock frequency, $\Delta f_s$ denotes the sampling clock frequency offset, and $-(M+j)(2N_{SC}+N_{CP})\Delta f_s/f_s^2$ denotes a delay offset caused by the sampling clock frequency offset.

Figure 3:
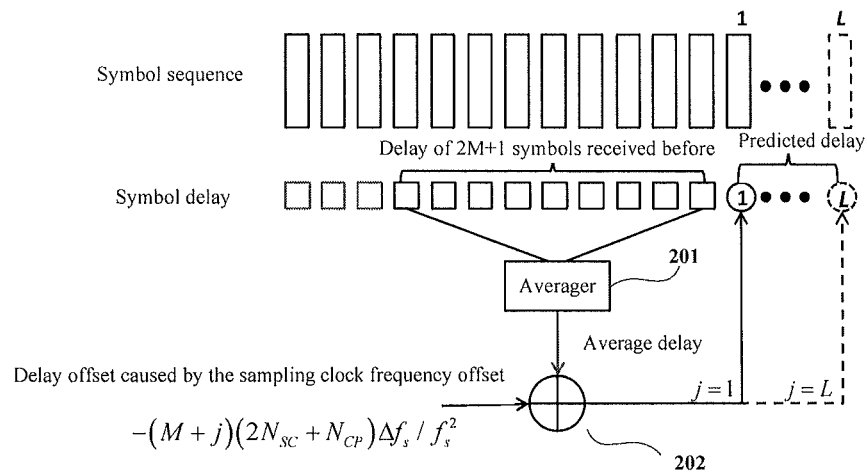
FIG. 3 is a flowchart of a method for predicting by using average delay by the predicting unit of Embodiment 1 of the present invention.

FIG. 3 is a flowchart of a method for predicting by using average delay by the predicting unit of this embodiment. As shown in FIG. 3, for example, an averager is used as denoising unit 201 and an adder is used as calculating unit 202; wherein, an existing method is used to obtain delay of 2M+1 symbols received before the currently received symbol, averager 201 calculates average delay of the 2M+1 symbols, and adder 202 adds up the average delay and a delay offset $-(M+j)(2N_{SC}+N_{CP})\Delta f_s/f_s^2$ caused by the sampling clock frequency offset, so as to obtain a predicted value of the delay of the currently received symbol or of the symbol received after the currently received symbol; and when j=1, a predicted value of the delay of the currently received symbol is obtained, and when j=L and L is an integer greater than 1, a predicted value of the delay of the L-th symbol after the currently received symbol is obtained.

Figure 4:
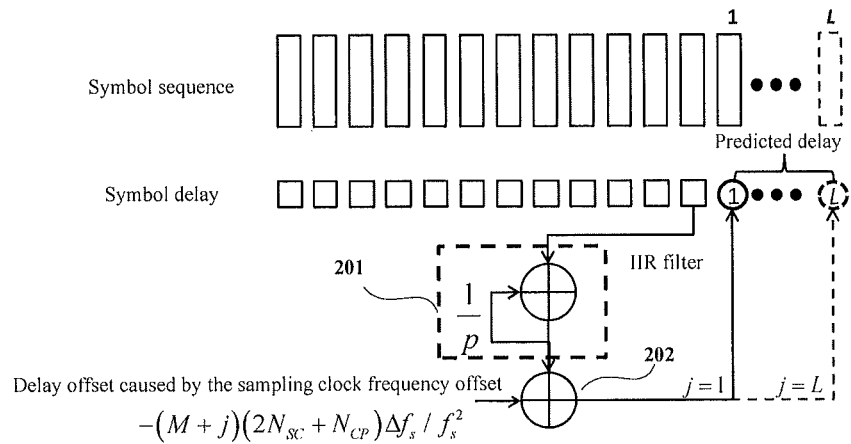
FIG. 4 is a flowchart of a method for predicting by using infinite impulse response filtering by the predicting unit of Embodiment 1 of the present invention.

FIG. 4 is a flowchart of a method for predicting by using infinite impulse response filtering by the predicting unit of this embodiment. As shown in FIG. 4, for example, an IIR filter is used as denoising unit 201 and an adder is used as calculating unit 202; wherein, an existing method is used to obtain delay several symbols received before the currently received symbol, IIR filter 201 performs infinite impulse response filtering to the several symbols one by one, and adder 202 adds up the infinite impulse response filtered delay and a delay offset $-(M+j)(2N_{SC}+N_{CP})\Delta f_s/f_s^2$ caused by the sampling clock frequency offset, so as to obtain a predicted value of the delay of the currently received symbol or of the symbol received after the currently received symbol; and when j=1, a predicted value of the delay of the currently received symbol is obtained, and when j=L and L is an integer greater than 1, a predicted value of the delay of the L-th symbol after the currently received symbol is obtained.

In this embodiment, timing synchronization unit 102 is configured to perform timing synchronization according to a predicted value of the delay of the currently received symbol or of the symbol received after the currently received symbol. Wherein, any method in the prior art may be used by the timing synchronization unit for performing the timing synchronization according to the predicted value, and it is not limited in embodiments of the present invention.

For example, let $\Delta_j + \epsilon_j = \hat{\tau}_{P,j} f_s$; where, $\Delta$ is an integral part, which is used in FFT window control in symbol synchronization and clock recovery, and $\epsilon$ is a decimal part, which is used in correction of remaining symbol delay.

Figure 5:
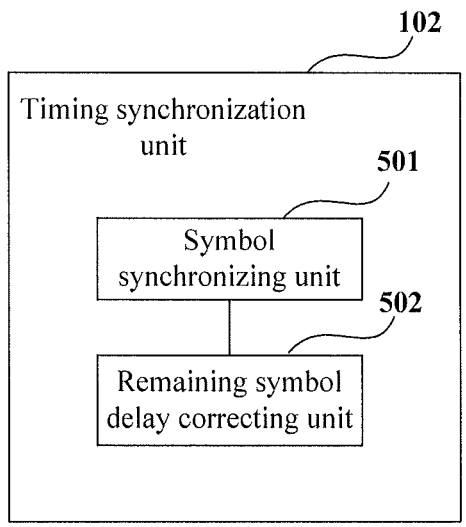
FIG. 5 is a schematic diagram of a structure of a timing synchronization unit of Embodiment 1 of the present invention.

FIG. 5 is a schematic diagram of a structure of the timing synchronization unit of this embodiment; however, embodiments of the present invention are not limited to such a structure. As shown in FIG. 5, timing synchronization unit 102 includes: a symbol synchronizing unit 501 and a remaining symbol delay correcting unit 502; wherein, symbol synchronizing unit 501 is configured to perform FFT window control in symbol synchronization and clock recovery according to a predicted value of the delay of the currently received symbol or of the symbol received after the currently received symbol;

and remaining symbol delay correcting unit 502 is configured to correct remaining symbol delay according to the predicted value of the delay of the currently received symbol or of the symbol received after the currently received symbol;

wherein predicting unit 101 obtains the delay of the symbols received before the currently received symbol before remaining symbol delay correcting unit 502 corrects the remaining symbol delay, and performs prediction based on the remaining symbol delay.

In this way, the correction of the remaining symbol delay is set as a forward structure, and loop delay in the prior art will not be produced, thereby further improving the performance of the communication system.

In this embodiment, the symbol synchronization and clock recovery of the multi-carrier modulation signals may be achieved based on the structure of the timing synchronization apparatus of this embodiment. In case of performing the symbol synchronization, a pilot subcarrier (such as a second subcarrier) of a low frequency or a pair of relatively near pilot subcarriers (such as a k-th subcarrier and a (k+1)-th subcarrier) may be selected in denoising and in predicting delay according to the delay of the previously received symbols; and in case of performing the clock recovery, a pilot subcarrier (such as a $N_{SC}/4$-th subcarrier) of an intermediate frequency or a pair of pilot subcarriers (such as a second subcarrier and a $N_{SC}/4$-th subcarrier) adjacent to each other in an intermediate distance may be selected in denoising and in predicting delay according to the delay of the previously received symbols; however, it is not limited in embodiments of the present invention.

Figure 6:
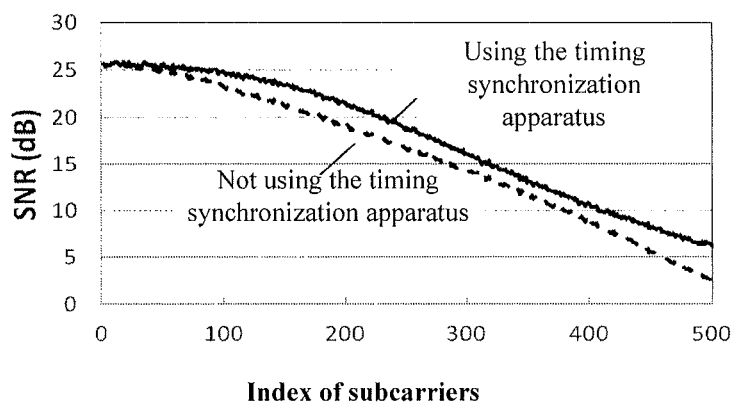
FIG. 6 is a schematic diagram of comparison of performance of using the timing synchronization apparatus of Embodiment 1 of the present invention and not using the apparatus.

FIG. 6 is a schematic diagram of comparison of performance of using the timing synchronization apparatus of the embodiment of the present invention and not using the apparatus. As shown in FIG. 6, using the timing synchronization apparatus of the embodiment may effectively improve a signal to interference plus noise ratio (SINR) of a multi-carrier modulation signal.

It can be seen from the above embodiment that by predicting delay of a currently received symbol or of a symbol received after the currently received symbol according to denoised delay of previously received symbols and performing timing synchronization based on the predicted symbol delay, a signal to noise ratio of multi-carrier modulation signals may be effectively improved, and an effect of a timing error on a communication system may be lowered, thereby improving performance of the communication system.

And the correction of the remaining symbol delay is set as a forward structure, and loop delay in the prior art will not be produced, thereby further improving the performance of the communication system.

Embodiment 2

Figure 7:
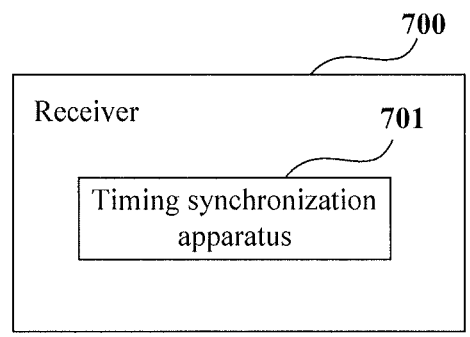
FIG. 7 is a schematic diagram of a structure of a receiver of Embodiment 2 of the present invention.

FIG. 7 is a schematic diagram of a structure of a receiver of Embodiment 2 of the present invention. As shown in FIG. 7, receiver 700 includes a timing synchronization apparatus 701, which is the timing synchronization apparatus according to Embodiment 1, and shall not be described herein any further.

Figure 8:
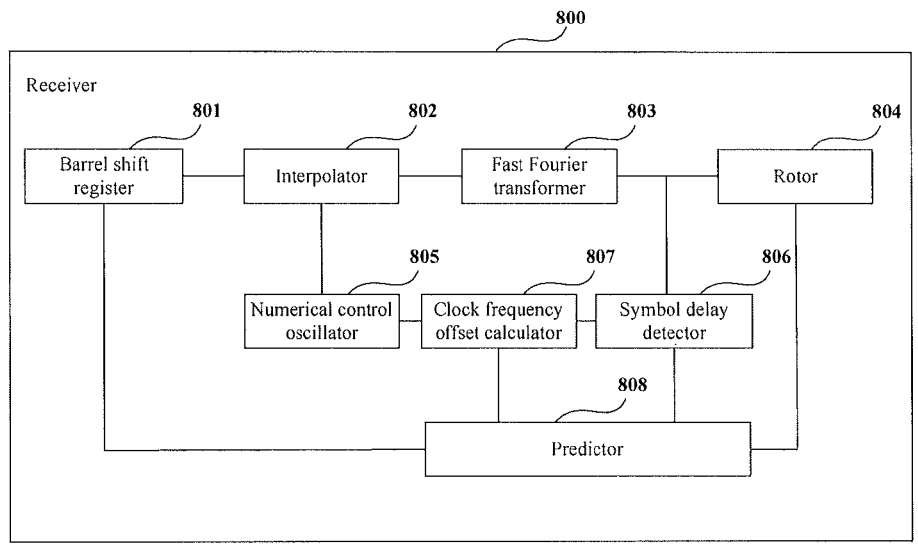
FIG. 8 is a schematic diagram of a structure of hardware of the receiver of Embodiment 2 of the present invention.

FIG. 8 is a schematic diagram of a structure of hardware of the receiver of Embodiment 2 of the present invention. As shown in FIG. 8, receiver 800 includes a barrel shift register 801, an interpolator 802, a fast Fourier transformer 803, a rotor 804, a numerical control oscillator 805, a symbol delay detector 806, a clock frequency offset calculator 807 and a predictor 808; wherein, barrel shift register 801 is configured to perform symbol synchronization according to a prediction result of predictor 808, interpolator 802 is configured to perform intra-symbol synchronization according to output of numerical control oscillator 805, fast Fourier transformer 803 is configured to perform FFT transform to signals, rotor 804 is configured to correct remaining symbol delay according to the prediction result of predictor 808, symbol delay detector 806 is configured to obtain delay of symbols received before a currently received symbol, clock frequency offset calculator 807 is configured to calculate a sampling clock frequency offset, and predictor 808 is configured to denoise the delay of the symbols received before the currently received symbol, and predict delay of the currently received symbol or of a symbol received after the currently received symbol according to the denoised symbol delay and the sampling clock frequency offset.

In this embodiment, predictor 808 corresponds to the predicting unit in Embodiment 1, barrel shift register 801 and rotor 804 correspond respectively to symbol synchronizing unit 501 and remaining symbol delay correcting unit 502 in Embodiment 1, and methods in Embodiment 1 may be used by symbol delay detector 806 and clock frequency offset calculator 807 for calculation, which shall not be described herein any further. Furthermore, structures of barrel shift register 801, interpolator 802, fast Fourier transformer 803, rotor 804, numerical control oscillator 805, symbol delay detector 806 and clock frequency offset calculator 807 are not defined in embodiments of the present invention.

In this embodiment, a method for obtaining delay of the symbols received before the currently received symbol, a method for denoising, a method for delay prediction and a method for timing synchronization according to a predicted value may be identical to those in Embodiment 1, which shall not be described herein any further.

It can be seen from the above embodiment that by predicting delay of a currently received symbol or of a symbol received after the currently received symbol according to denoised delay of previously received symbols and performing timing synchronization based on the predicted symbol delay, a signal to noise ratio of multi-carrier modulation signals may be effectively improved, and an effect of a timing error on a communication system may be lowered, thereby improving performance of the communication system.

And the correction of the remaining symbol delay is set as a forward structure, and loop delay in the prior art will not be produced, thereby further improving the performance of the communication system.

Embodiment 3

Figure 9:
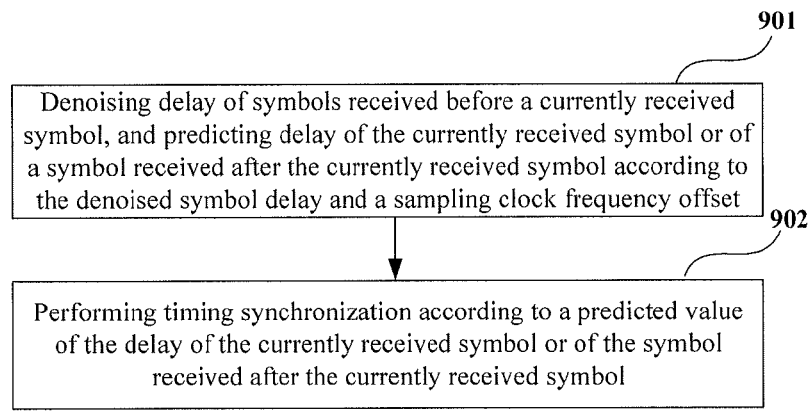
FIG. 9 is a flowchart of a timing synchronization method for multi-carrier modulation signals of Embodiment 3 of the present invention.

FIG. 9 is a flowchart of a timing synchronization method for multi-carrier modulation signals of Embodiment 3 of the present invention, corresponding to the timing synchronization apparatus of Embodiment 1. As shown in FIG. 9, the method includes:

step 901: denoising delay of symbols received before a currently received symbol, and predicting delay of the currently received symbol or of a symbol received after the currently received symbol according to the denoised symbol delay and a sampling clock frequency offset; and step 902: performing timing synchronization according to a predicted value of the delay of the currently received symbol or of the symbol received after the currently received symbol.

In this embodiment, a method for obtaining delay of the symbols received before the currently received symbol, a method for denoising, a method for delay prediction and a method for timing synchronization according to a predicted value may be identical to those in Embodiment 1, which shall not be described herein any further.

It can be seen from the above embodiment that by predicting delay of a currently received symbol or of a symbol received after the currently received symbol according to denoised delay of previously received symbols and performing timing synchronization based on the predicted symbol delay, a signal to noise ratio of multi-carrier modulation signals may be effectively improved, and an effect of a timing error on a communication system may be lowered, thereby improving performance of the communication system.

And the correction of the remaining symbol delay is set as a forward structure, and loop delay in the prior art will not be produced, thereby further improving the performance of the communication system.

The above apparatus and method of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above.

The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

Supplements

Supplement 1. A timing synchronization apparatus for multi-carrier modulation signals, comprising:

a predicting unit configured to denoise delay of symbols received before a currently received symbol, and to predict delay of the currently received symbol or of a symbol received after the currently received symbol according to the denoised symbol delay and a sampling clock frequency offset; and a timing synchronization unit configured to perform timing synchronization according to a predicted value of the delay of the currently received symbol or of the symbol received after the currently received symbol.

Supplement 2. The apparatus according to supplement 1, wherein the timing synchronization unit comprises:

a remaining symbol delay correcting unit configured to correct remaining symbol delay according to the predicted value of the delay of the currently received symbol or of the symbol received after the currently received symbol;

wherein the predicting unit obtains the delay of the symbols received before the currently received symbol before the remaining symbol delay correcting unit corrects the remaining symbol delay.

Supplement 3. The apparatus according to supplement 1 or 2, wherein the predicting unit comprises:

a denoising unit configured to denoise delay of the symbols received before the currently received symbol; and a calculating unit configured to predict the delay of the currently received symbol or of the symbol received after the currently received symbol according to the denoised symbol delay and the sampling clock frequency offset;

wherein the denoising unit comprises:

an average value calculator configured to calculate average delay of the symbols received before the currently received symbol; or an infinite impulse response filter configured to perform infinite impulse response filtering to the delay of the symbols received before the currently received symbol.

Supplement 4. The apparatus according to supplement 3, wherein, the calculating unit calculates the predicted value of the delay of the currently received symbol or of the symbol received after the currently received symbol according to the average delay and a delay offset caused by the sampling clock frequency offset, or the infinite impulse response filtered delay and a delay offset caused by the sampling clock frequency offset.

Supplement 5. The apparatus according to supplement 4, wherein the calculating unit calculates the predicted value of the delay of the currently received symbol or of the symbol received after the currently received symbol according to formula (1) below:

$$\hat{\tau}_{P,j} = \hat{\tau}_{middle} - (M+j)(2N_{SC}+N_{CP})\Delta f_s/f_s^2 \quad (1)$$

where, M>0, and j is a positive integer; when j=1, $\hat{\tau}_{P,j}$ denotes the delay of the currently received symbol, and when j>1, $\hat{\tau}_{P,j}$ denotes the delay of a j-th symbol received after the currently received symbol; $\hat{\tau}_{middle}$ denotes the average delay or the infinite impulse response filtered delay; $N_{SC}$ denotes a number of subcarriers; $N_{CP}$ denotes a number of cyclic prefixes; $f_s$ denotes a sampling clock frequency; and $\Delta f_s$ denotes the sampling clock frequency offset.

Supplement 6. A receiver, comprising the apparatus as described in any one of supplements 1-5.

Supplement 7. A timing synchronization method for multi-carrier modulation signals, comprising:

denoising delay of symbols received before a currently received symbol, and predicting delay of the currently received symbol or of a symbol received after the currently received symbol according to the denoised symbol delay and a sampling clock frequency offset; and performing timing synchronization according to a predicted value of the delay of the currently received symbol or of the symbol received after the currently received symbol.

Supplement 8. The method according to supplement 7, wherein the performing timing synchronization according to a predicted value of the delay of the currently received symbol or of the symbol received after the currently received symbol includes: correcting remaining symbol delay according to the predicted value of the delay of the currently received symbol or of the symbol received after the currently received symbol;

wherein the delay of the symbols received before the currently received symbol is obtained before correcting the remaining symbol delay.

Supplement 9. The method according to supplement 7 or 8, wherein the denoising delay of symbols received before a currently received symbol includes:

calculating average delay of symbols received before the currently received symbol; or performing infinite impulse response filtering to the delay of the symbols received before the currently received symbol.

Supplement 10. The method according to supplement 9, wherein, the predicting delay of the currently received symbol or of a symbol received after the currently received symbol according to the denoised symbol delay and a sampling clock frequency offset includes: calculating the predicted value of the delay of the currently received symbol or of the symbol received after the currently received symbol according to the average delay and a delay offset caused by the sampling clock frequency offset, or the infinite impulse response filtered delays and a delay offset caused by the sampling clock frequency offset.

Supplement 11. The method according to supplement 10, wherein the predicted value of the delay of the currently received symbol or of the symbol received after the currently received symbol is calculated according to formula (1) below:

$$\hat{\tau}_{P,j} = \hat{\tau}_{middle} - (M+j)(2N_{SC}+N_{CP})\Delta f_s/f_s^2 \quad (1)$$

where, M>0, and j is a positive integer; when j=1, $\hat{\tau}_{P,j}$ denotes the delay of the currently received symbol, and when j>1, $\hat{\tau}_{P,j}$ denotes the delay of a j-th symbol received after the currently received symbol; $\hat{\tau}_{middle}$ denotes the average delay or the infinite impulse response filtered delay; $N_{SC}$ denotes a number of subcarriers; $N_{CP}$ denotes a number of cyclic prefixes; $f_s$ denotes a sampling clock frequency; and $\Delta f_s$ denotes the sampling clock frequency offset.

The invention claimed is:

1. A timing synchronization apparatus for multi-carrier modulation signals, comprising:

a predicting unit configured to denoise delay of symbols received before a currently received symbol, and to predict a predicted delay of the one of the currently received symbol and a symbol received after the currently received symbol according to a denoised symbol delay and a sampling clock frequency offset;

a timing synchronization unit configured to perform timing synchronization according to a predicted value of the predicted delay of one of the currently received symbol and the symbol received after the currently received symbol;

wherein the timing synchronization unit comprises:

a remaining symbol delay correcting unit configured to correct remaining symbol delay according to the one of the predicted value of the predicted delay of the currently received symbol and the symbol received after the currently received symbol; and wherein the predicting unit obtains delay of the symbols received before the currently received symbol before the remaining symbol delay correcting unit corrects the remaining symbol delay.

2. The apparatus according to claim 1, wherein the predicting unit comprises:

a denoising unit configured to denoise delay of the symbols received before the currently received symbol; and a calculating unit configured to predict the predicted delay of the one of the currently received symbol and the symbol received after the currently received symbol according to the denoised symbol delay and the sampling clock frequency offset;

wherein the denoising unit comprises one of:

an average value calculator configured to calculate average delay of the symbols received before the currently received symbol; and an infinite impulse response filter configured to perform infinite impulse response filtering to the delay of the symbols received before the currently received symbol.

3. The apparatus according to claim 2, wherein, one of the calculating unit calculates the predicted value of the predicted delay of the one of the currently received symbol and the symbol received after the currently received symbol according to the average delay and a delay offset caused by the sampling clock frequency offset, and the infinite impulse response filtered delay and a delay offset caused by the sampling clock frequency offset.

4. The apparatus according to claim 3, wherein the calculating unit calculates the predicted value of the predicted delay of the one of the currently received symbol and of the symbol received after the currently received symbol according to formula (1) below:

$$\hat{\tau}_{P,j} = \hat{\tau}_{middle} - (M+j)(2N_{SC}+N_{CP})\Delta f_s/f_s^2 \quad (1)$$

where, M>0, and j is a positive integer; when j=1, $\hat{\tau}_{P,j}$ denotes the delay of the currently received symbol, and when j>1, $\hat{\tau}_{P,j}$ denotes the delay of a j-th symbol received after the currently received symbol; $\hat{\tau}_{middle}$ denotes one of the average delay and the infinite impulse response filtered delay; $N_{SC}$ denotes a number of subcarriers; $N_{CP}$ denotes a number of cyclic prefixes; $f_s$ denotes a sampling clock frequency; and $\Delta f_s$ denotes the sampling clock frequency offset.

5. A receiver, comprising the apparatus as claimed in claim 1.

6. A timing synchronization method for multi-carrier modulation signals, comprising:

denoising delay of symbols received before a currently received symbol, and predicting delay of one of the currently received symbol and a symbol received after the currently received symbol according to a denoised symbol delay and a sampling clock frequency offset;

performing timing synchronization according to a predicted value of predicted delay of one of the currently received symbol and of the symbol received after the currently received symbol; wherein the performing timing synchronization according to a predicted value of the delay of the currently received symbol or of the symbol received after the currently received symbol comprises: correcting remaining symbol delay according to the predicted value of the one of the predicted delay of the currently received symbol and the symbol received after the currently received symbol; and wherein delay of the symbols received before the currently received symbol is obtained before correcting the remaining symbol delay.

7. The method according to claim 6, wherein the denoising delay of symbols received before a currently received symbol comprises one of:

calculating average delay of symbols received before the currently received symbol; and performing infinite impulse response filtering to the delay of the symbols received before the currently received symbol.

8. The method according to claim 7, wherein, one of predicting delay of the one of the currently received symbol and a symbol received after the currently received symbol according to the denoised symbol delay and a sampling clock frequency offset comprises: calculating the predicted value of the predicted delay of the one of the currently received symbol and the symbol received after the currently received symbol according to the average delay and a delay offset caused by the sampling clock frequency offset, and the infinite impulse response filtered delays and a delay offset caused by the sampling clock frequency offset.

\* \* \* \* \*